(12) United States Patent
Robadey

(10) Patent No.: US 9,147,151 B2
(45) Date of Patent: Sep. 29, 2015

(54) RFID EAR TAG

(71) Applicant: ASSA ABLOY AB, Stockholm (CH)

(72) Inventor: Jean-Miguel Robadey, Bossonnens (CH)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 14/480,856

(22) Filed: Sep. 9, 2014

(65) Prior Publication Data

US 2015/0068077 A1     Mar. 12, 2015

(30) Foreign Application Priority Data

Sep. 12, 2013   (CH) ..................... 1570/13

(51) Int. Cl.
*A01K 11/00*       (2006.01)
*G06K 19/077*      (2006.01)
*G09F 3/02*        (2006.01)

(52) U.S. Cl.
CPC ........ *G06K 19/07758* (2013.01); *A01K 11/004* (2013.01); *G09F 3/02* (2013.01)

(58) Field of Classification Search
CPC . A01K 11/001; A01K 11/004; A01K 11/006; A01K 11/00
USPC ............................................ 40/300, 301, 302
See application file for complete search history.

(56) References Cited

U.S. PATENT DOCUMENTS

2006/0117619 A1 *  6/2006  Costantini .................. 40/301

FOREIGN PATENT DOCUMENTS

| AU | 2008249220 | | 1/2010 | |
|---|---|---|---|---|
| DE | 29812383 | | 10/1998 | |
| EP | 2465344 A1 | * | 6/2012 | ............ A01K 11/00 |
| WO | WO 2009070021 A1 | * | 6/2009 | |

OTHER PUBLICATIONS

Extended European Search Report for European Patent Application No. 14183362.4, dated Feb. 6, 2015, 6 pages.

* cited by examiner

*Primary Examiner* — Casandra Davis
(74) *Attorney, Agent, or Firm* — Sheridan Ross P.C.

(57) ABSTRACT

The RFID tag part comprises at least a housing (2) to house a transponder (1), and a washer (3) to maintain said transponder in said housing first part.

11 Claims, 2 Drawing Sheets

RFID EAR TAG

CROSS REFERENCE TO RELATED APPLICATIONS

This application claims the benefit of Swiss Patent Application No. 01570/13 filed Sep. 12, 2013, the entire disclosure of which is incorporated herein by reference.

TECHNICAL FIELD

The present invention concerns the field of RFID tags, in particular the field of ear tags that are attached to animals.

BACKGROUND ART

Ear tag manufacturers are all experts in injection of plastic, in this case TPU. These manufacturers mainly inject visual ear tags that will be attached to the ears of the animal. Nowadays the market and consumers demand a better traceability of the animal and RFID ear tags became a new standard in addition of the visual ear tag. EU, Australia and Turkey to come all require livestock to be identified with RFID in addition to a visual ear tag. RFID will be deployed around the world and all players will have to produce RFID ear tag if they want to stay active in this market.

Ear tag manufacturers that haven't invested in the RFID technology yet need to develop and invest solutions in order to keep market share and follow the market demand. The problem that they have is that they are most of the time late in development and don't have the expertise.

Additionally the production of RFID ear tag being more complex there is high chance that they will have to invest in new injection machine depending of the process of assembling they are going to use.

Current assembling processes are for example the following:

Ultrasonic welding: The housings are molded on a conventional injection machine. The transponder is glued inside the housing and then US welded. The process requires investing in dispensing and US welding equipments. Quality might be difficult to maintain and number of operations is increased compare with overmolding process Overmolding: The housing is molded and then the transponder is positioned into the housing and overmolded. This is the most economical and durable process in mass production. The invention presented is based on the overmolding process.

All the ear tag manufacturers that don't have vertical injection machines and that need a solution that can be put easily in place in their factory without investing in new injection machines. Customers are looking for an assembling process that enables them to minimize their investment, keep a good quality level and stay price competitive.

Most of the ear tags manufacturer own horizontal injection machines. The horizontal version is the standard of the industry for mass production as ejection of the parts is done automatically because of the gravity. Injected parts are ejected and fall down naturally in a box thus manpower is not needed in permanence.

In the case of the vertical injection machine a person or mechanical system is needed in permanence to remove the parts from the mold thus requires more assistance. This type of machine is only use in specific cases and industrials avoid using it for their production.

Knowing that injectors do mainly have horizontal injection machines the goal of this invention is mainly dedicated to this type of machine but could also be used with horizontal injection machine if needed.

In the art, the housing is molded normally with a conventional injection machine. This one is ejected and by gravity fall down into a box below the machine. The machine can run without intervention of an operator.

The transponder is then mounted into the housing. It must be noted that, 1: the tolerances of the injected parts, 2: the tolerances of the transponder, 3; the tolerance needed to insert the transponder into the housing require that the tag is lose inside the cavity. In the case the transponder would be squeezed inside the cavity there would be a high risk to pre-damage or damage completely the transponder before the final assembling. Additionally because of the various tolerances mentioned above the tension exerted on the coil would vary quite a bit from part to part and could lead to production yield instability with risk to have higher failure rate in the field.

Nevertheless it is necessary to find a way to maintain the transponder into the housing when this is put into the mold for the second and final injection step. If the transponder is not maintained properly, this one will fall down because of 1; gravity 2; flow of the material during second injection that will push the coil at the opposite side of the mold. For these reasons the process not functional. Various options could be used to maintain the e-unit during the second injection such as Gluing the coil: additional step and require dispensing equipment and new process to be put in place in the factory. Lower inputs as drying of the glue is needed Mechanical: coil is squeezed inside the housing. Not a good solution as mentioned above as risk to pre-damage the coil is high In a first configuration with a transponder loose in the housing such a configuration has the following features/disadvantages:

No stress on the coil

Coil is not maintained thus coil can fall down and move during second injection

Solution not accepted

In a configuration with a transponder squeezed in the housing, such a configuration has the following features/disadvantages:

Example shows that coil is maintained with 4 points

Risk to create lose wire, break wire during insertion

Pressure not stable from part to part due to tolerances

Solution risky

In a configuration with a transponder glued into the housing such a configuration has the following features/disadvantages:

Glue maintains the transponder for the handling only

Dispensing equipment are needed

Space for curing needed

Solution expensive and slow output

DETAILED DESCRIPTION OF THE INVENTION

FIGS. 1 to 4 illustrate an example of a solution according to the present invention.

Specifically,

Figure 1:
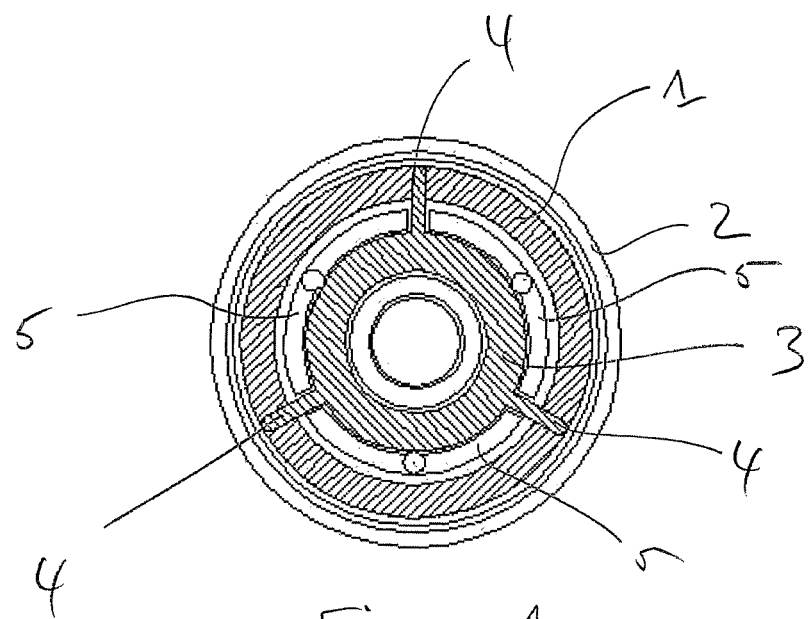
FIG. 1 illustrates schematically a front cut view of an open female part of the tag.

Features and advantages of the proposed solution are
- Keep the transponder free in the cavity.
- Avoid stress on the coil thus limit the risk to have failure rate abnormal in production and in the field
- Be able to use the conventional injection machine
- Apart from the mold no investment needed
- Assembling can be made manually or if volume are high in automatic with Robotics
- Low failure rate in production The female part of an ear tag comprises usually 4 elements defined below (see FIGS. 1 and 2)
- A transponder 1
- A housing 2
- A washer 3
- A second cover made with the second injection step of the production process Coil 1 is normally positioned into the housing 2 without adding any glue. As illustrated, the housing 2 has a body 8, a central cavity 9 formed in the body 8, an outwardly extending planar portion 10 and an upturned annular wall 11 formed at the edge of the planar portion. A recessed portion 12 is formed by and to the interior of the annular wall 11. Then a washer 3 with special dents/extensions 4 is mounted into the housing 2. This washer 3 is maintained by three parts 5 of the internal ring, for example.

Figure 3:
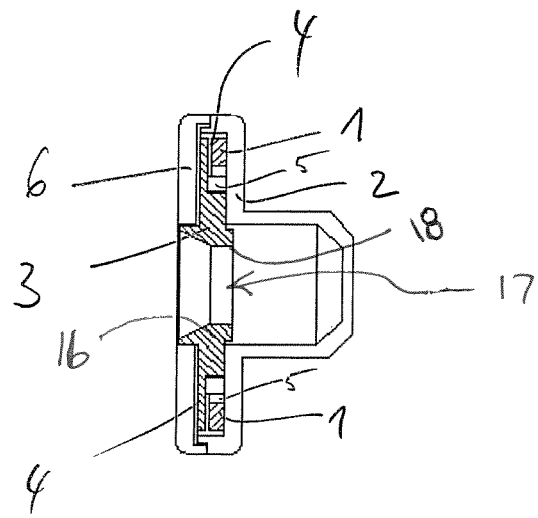
FIG. 3 illustrates schematically a side cut view of a closed female part of the tag.

As result the coil 1 cannot move away from the cavity during operation of insertion into the mold and during the second injection step during which a cover 6 is added on the housing 2 to close it (see FIG. 3 illustrating a closed female part of tag).

The ear tag concept presented in the present application is designed to include a special washer 3 that could be also called the locking mechanism of the ear tag.

Figure 4:
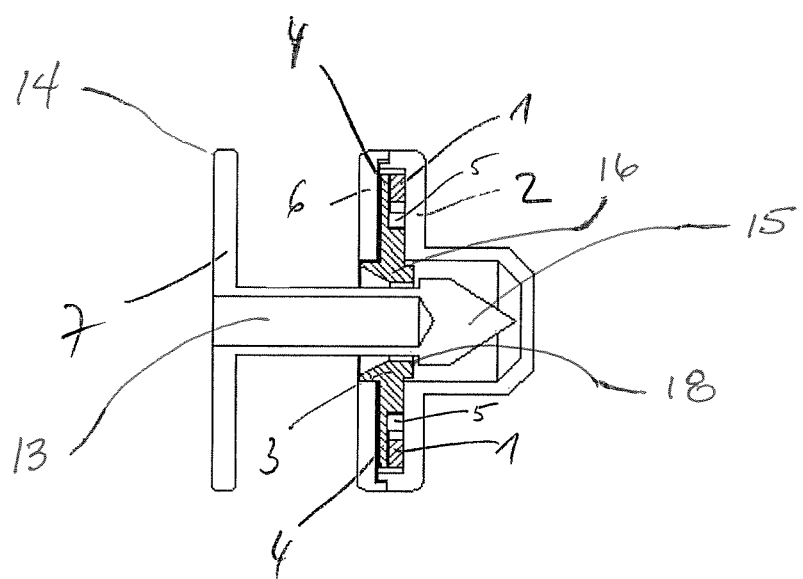
FIG. 4 illustrates schematically a side cut view of the female and male parts of the tag.

As is known, the washer 3 is the part that maintains and locks the stud or pin 7 between the two elements of the tag, this principle being illustrated in FIG. 4.

The stud 7 is introduced into the female part with an applicator. The male part 7 and washer 3 are especially designed to be compatible to enable easy assembling and ensure low failure rate in the application. As illustrated, the pin or stud 7 comprises a body 13, an annular planar portion 14 disposed at one end of the body 13 and a head portion 15 disposed at the opposite end of the body 13. The washer comprises a body 16 with a central aperture 17. A shoulder 18 is formed at the base of the aperture 17 to engage the head of the pin or stud 7.

Figure 2:
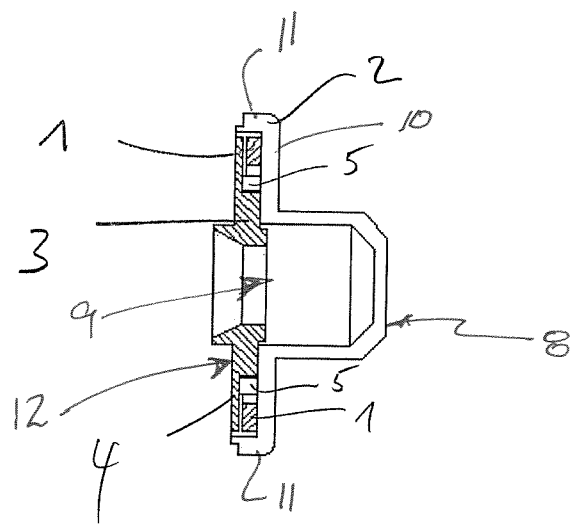
FIG. 2 illustrates schematically a side cut view of the female part of the tag of FIG. 1.

In the present invention, a supplementary function is added to washer 3 this being to maintain the transponder 1 in the housing 2 as illustrated in FIGS. 1 and 2.

The concept of a female ear tag with the locking mechanism made of a separated part (here the washer 3) gives some advantages compare with a traditional process that would include the concept "all in one" discussed above.

Possibility to use different material resins with different mechanical resistance. The locking mechanism requires the material to resist to traction and might require another material than TPU.

A separate washer 3 facilitates the design of the mold as no complex pin needed to create the locking mechanism.

A separate washer 3 avoids stress and deformation of the tag when the mold opens. In case the locking mechanism is part of the housing a special pin must be extracted from the central part thus material must be deformed by the pin to be extracted.

The embodiments given in the present description are only examples and should not be construed in a limiting manner. Other equivalent means as possible within the spirit and scope of the present invention. For example, the washer 3 may be attached by other means to the housing 2 than walls 5.

Also, the washer 3 may comprise other means than the dents 4 to maintain the transponder and coil 1 in the housing 2: such means include for example protuberences, a variable diameter, an oval external shape etc.

The invention claimed is:

1. An RFID ear tag comprising, a housing;
a cover associated with the housing;
a transponder positioned on the housing and between the cover and the housing;
a washer affixed to the housing and positioned between the housing and the cover, the washer comprising means to maintain the transponder in the housing; and
a second part cooperating with the housing to attach the tag to an ear of an animal.

2. The tag as defined in claim 1, wherein the washer comprises a body portion and the means to maintain the transponder in the housing comprises a plurality of extensions extending outwardly from the body.

3. The tag as defined in claim 2, wherein the washer is maintained on said housing by attachment means.

4. The tag as defined in claim 3, wherein said attachment means is an internal ring.

5. The tag as defined in claim 4, where in the internal ring comprises a plurality of arcuate shaped segments.

6. A tag as defined in claim 1, wherein said second part is a stud or a pin.

7. An ear tag comprising:
an annular housing comprising a body portion, the body portion having a central cavity, an outwardly extending planar portion and an upturned annular wall formed at the edge of the planar portion defining a recessed portion;
a transponder positioned in the recessed portion;
a washer mounted to the housing and securing the position of the transponder, the washer comprising an annular body portion and a plurality of extensions extending radially outwardly from the body portion; and
a cover configured to enclose the recessed portion and secure the washer and the transponder in the housing, the cover having a central aperture that is aligned with the central cavity of the housing.

8. The ear tag of claim 7, wherein the washer further comprises a central aperture formed in the body portion and aligned with the cavity in the housing, and wherein the aperture forms a shoulder portion.

9. The ear tag of claim 8, further comprising a stud or pin having a body, an annular planar portion disposed at one end of the body and a head portion disposed at the opposite end of the body and configured to extend through the apertures in the cover and washer and engage the shoulder formed in the body portion of the washer.

10. The ear tag of claim 7, further comprising an internal ring disposed between the central cavity and the upturned annular wall and wherein the internal ring is configured to maintain the position of the washer in the housing.

11. The ear tag of claim 10, wherein the internal ring comprises a plurality of curved wall portions.

* * * * *